United States Patent [19]

Scales, III et al.

[11] Patent Number: 4,914,573
[45] Date of Patent: Apr. 3, 1990

[54] BUS MASTER WHICH SELECTIVELY ATTEMPTS TO FILL COMPLETE ENTRIES IN A CACHE LINE

[75] Inventors: Hunter L. Scales, III, Austin; William C. Moyer, Dripping Springs; Donald C. Anderson, Austin, all of Tex.

[73] Assignee: Motorola, Inc., Schaumburg, Ill.

[21] Appl. No.: 105,854

[22] Filed: Oct. 5, 1987

[51] Int. Cl.[4] .................... G06F 9/34; G06F 12/04; G06F 13/16
[52] U.S. Cl. .................... 364/200; 364/243; 364/243.4; 364/240; 364/240.3; 364/262.4
[58] Field of Search ... 364/200 MS File, 900 MS File

[56] References Cited

U.S. PATENT DOCUMENTS

| | | | |
|---|---|---|---|
| 4,237,543 | 12/1980 | Nishio et al. | 364/900 |
| 4,271,466 | 6/1981 | Yamamoto et al. | 364/200 |
| 4,276,596 | 6/1981 | Flynn et al. | 364/200 |
| 4,315,312 | 2/1982 | Schmidt | 364/200 |
| 4,371,928 | 2/1983 | Barlow et al. | 364/200 |
| 4,447,878 | 5/1984 | Kinnie et al. | 364/200 |
| 4,467,447 | 8/1984 | Takahashi et al. | 364/900 |
| 4,633,437 | 12/1986 | Mothersole et al. | 364/900 |

Primary Examiner—Archie E. Williams, Jr.
Assistant Examiner—Emily Y. Chan
Attorney, Agent, or Firm—Robert L. King

[57] ABSTRACT

A data processing system has a bus meter, a memory capable of transferring operands requested by the bus master, and a cache for temporarily storing a selected number of the most recently transferred operands. If the memory provides an operand or a portion thereof which is insufficient in size or alignment to fill a complete entry in a line in the cache, the bus master automatically transfers additional operands adjacent in the memory to the requested operand sufficient to fill that entry.

10 Claims, 4 Drawing Sheets

| TAG | VALID [A3,A2] | | | | OPERAND ENTRIES | | | | | | | | | | | | | [A3,A2] |
|---|---|---|---|---|---|---|---|---|---|---|---|---|---|---|---|---|---|---|
| | | | | | 00 | | | | 01 | | | | 10 | | | | 11 | |
| | 0 0 | 0 1 | 1 0 | 1 1 | 0 0 | 0 1 | 1 0 | 1 1 | 0 0 | 0 1 | 1 0 | 1 1 | 0 0 | 0 1 | 1 0 | 1 1 | 0 0 | 0 1 | 1 0 | 1 1 | [A1,A0] |
| | | | | | 0 | 1 | 2 | 3 | 4 | 5 | 6 | 7 | 8 | 9 | A | B | C | D | E | F | |

|   | SS<br>RR I IRRCC<br>eeZZeeuuE<br>qq qqrrF<br>DD I<br>SSSSAAAAL<br>10101010L | C<br>u<br>r<br>N<br>x<br>NNt NN<br>xxEOCxx<br>ttFPYtt<br>ICC<br>AALOOSS<br>10LMN10 |
|---|---|---|
| 0 | 01010x01x | 0011000 |
| 1 | 1010000xx | 0011010 |
| 2 | 01100x0xx | 0011000 |
| 3 | 0101x0x0x | 0011001 |
| 4 | 1x0x0010x | 0011000 |
| 5 | 10xx0001x | 0011010 |
| 6 | 11x000xxx | 0000001 |
| 7 | 11xx00x1x | 0000001 |
| 8 | 100x0x10x | 0011001 |
| 9 | xx0x0x101 | 0010000 |
| 10 | 0xxxx1x00 | 0000010 |
| 11 | 00xx1x1xx | 0000010 |
| 12 | x10x0x00x | 0100010 |
| 13 | xx011x11x | 0011010 |
| 14 | xx01x111x | 0011001 |
| 15 | xxxx1001x | 0000100 |
| 16 | 11xx1x1xx | 0000010 |
| 17 | xx0x1100x | 0110010 |
| 18 | xxxx1110x | 0000100 |
| 19 | x0xx010xx | 0000001 |
| 20 | x00xx0x0x | 0100001 |
| 21 | xxxx0011x | 0000100 |
| 22 | xxxxx1x11 | 0010001 |
| 23 | xxxx0100x | 0000100 |
| 24 | x1xx010xx | 0000010 |
| 25 | xx101x1xx | 0011010 |
| 26 | xx0xx0x01 | 0110001 |
| 27 | xx0xxx10x | 1100000 |
| 28 | xxx00x1xx | 0000100 |
| 29 | 0xxx0x0xx | 0000010 |
| 30 | x1xx0x1xx | 0000001 |
| 31 | xx11xxxxx | 0000100 |
| 32 | xxx0xxxx1 | 0000100 |
| 33 | xxxxxx01x | 1000000 |
| 34 | xxx00xxxx | 1000000 |
| 35 | xx00xxxxx | 0000100 |

*FIG. 6*

BUS MASTER WHICH SELECTIVELY ATTEMPTS TO FILL COMPLETE ENTRIES IN A CACHE LINE

FIELD OF THE INVENTION

The subject invention relates generally to bus masters and, more particularly, to a bus master which operates in conjunction with a cache memory.

BACKGROUND ART

In general, cache memories are arranged as a plurality of "lines", each containing a plurality of "entries" which share a common "tag address", and a corresponding number of "valid" bits which when set indicate the validity of the respective entries in the particular cache line. In normal operation, required operands are requested from a conventional system memory by an appropriate system bus master. If a requested operand is present in the cache memory, the cache provides that operand and the system memory request is aborted. If the requested operand is not in the cache, the operand will be provided by the system memory. Simultaneously, the operand will be stored in the cache, so long as the operand is sufficient to fill a full entry. Typically, the bus master then fetches the other operands having the same tag address in the system memory, to fill the entire cache line. However, if an operand (or some portion of an operand) is fetched that is insufficient in either size or alignment to fill an entire entry, the operand is not cached at all, and the bus master makes no further attempts to fill the other entries in the same cache line.

SUMMARY OF THE INVENTION

Accordingly, it is an object of the present invention to provide a bus master which selectively attempts to fill entire entries in a cache line.

These and other objects are achieved in a bus master which transfers a requested operand from a memory into an entry in a cache line having a selected tag address, wherein the operand or portion thereof provided by the memory during the initial (and perhaps only) bus cycle of an operand transfer cycle may be insufficient in either size or alignment to fill an entire entry in the cache line. In accordance with the present invention, the bus master comprises: size determining logic for determining if the operand (or portion thereof) provided by the memory during the initial bus cycle will fill the entire entry, and for providing an entry fill signal if the operand (portion) is insufficient to fill that entry; and bus cycle control logic, responsive to the entry fill signal, for transferring additional operands adjacent in said memory to said requested operand sufficient to fill said entry during respective subsequent bus cycles.

BRIEF DESCRIPTION OF THE DRAWINGS

FIG. 6 illustrates in table form, the inputs and outputs of the PLA shown in FIG. 4.

DESCRIPTION OF THE INVENTION

Figures 1, 2:
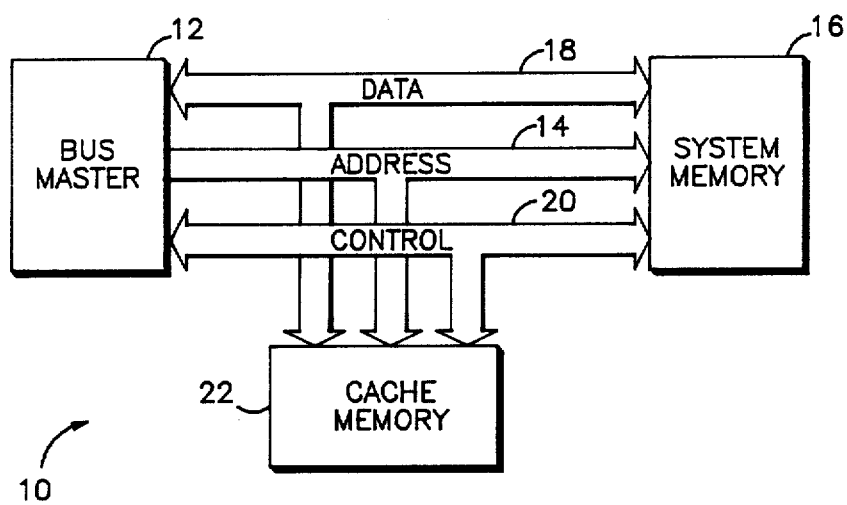
FIG. 1, illustrates in block diagram form, a data processing system having a bus master which cooperates with a cache memory in accordance with the present invention.
FIG. 2 illustrates the format of a line in the cache memory shown in FIG. 1.

Shown in FIG. 1 is a data processing system 10 comprised of a bus master 12 which requests operands via an address bus 14, and a system memory 16 which provides the requested operands via a data bus 18, with each operand transfer being coordinated via a control bus 20 during an operand transfer cycle which may include more than one bus cycle. In the illustrated form, a conventional cache memory 22 provides a high-speed store for a selected number of the most recently transferred operands. In the preferred form, the data bus 18 is 32-bits wide, but the bus master 12 and the system memory 16 are specially adapted to coordinate the transfer of byte (8-bit), word (16-bit) and longword (32-bit) operands. In this form, the data bus 18 is longword aligned with respect to the system memory 16, but the operands themselves may be aligned in the system memory 16 on any byte boundary. Thus, due to either operand size or address misalignment, some operand transfer cycles may consist of multiple bus cycles, with only a portion of the full operand being transferred each bus cycle. It follows, therefore, that only a portion of the transfer capacity of the data bus 18 will be required during at least some, if not all, of these bus cycle system of this type is shown and described in detail in U.S. Pat. No. 4,633,4337 and the description thereof is hereby incorporated herein by reference.

In the preferred form shown in FIG. 2, each "line" of the cache memory 22 consists of four longword "entries", a "valid" bit for each entry, and a "tag address" common to all four of the entries. Since there are only four valid bits, one for each entry, any transferred operand which is less than a longword in length cannot be cached. Thus, for example, if the transferred operand is less than a longword in length, say only a byte, the operand cannot be cached and, in prior art systems, would have to be retrieved from the system memory 16 each time it is required. Similarly, since the entries are longword aligned, any transferred operand that is not longword aligned in the system memory 16 cannot be cached either. Thus, for example, a longword operand which is aligned on a non-longword boundary in the system memory 16 will "span" two entries in the cache memory 22 but fill neither.

In order to facilitate the cacheing of as many operands as possible (and thus maximize the efficiency of the data processing system 10 as a whole), the bus master 12 is specially adapted in accordance with the present invention to detect when a transferred operand is insufficient in either size or alignment to fill an entire entry, and to automatically transfer sufficient additional operands adjacent in the system memory 16 to the requested operand to fill the entire entry in the cache line. In general, these "adjacent" operands would be all other bytes having the same tag and entry address bits as the requested operand or portion thereof. The transfers of these "nonrequested" operands (but which are required to fill-out cache entries) are preferably interspersed with transfers of the requested operands, even if to do so the latter transfers must be delayed. In many systems, any delays in processing activity will be more than compensated for by the increased "hit rate" in the cache memory 22.

Figure 3:
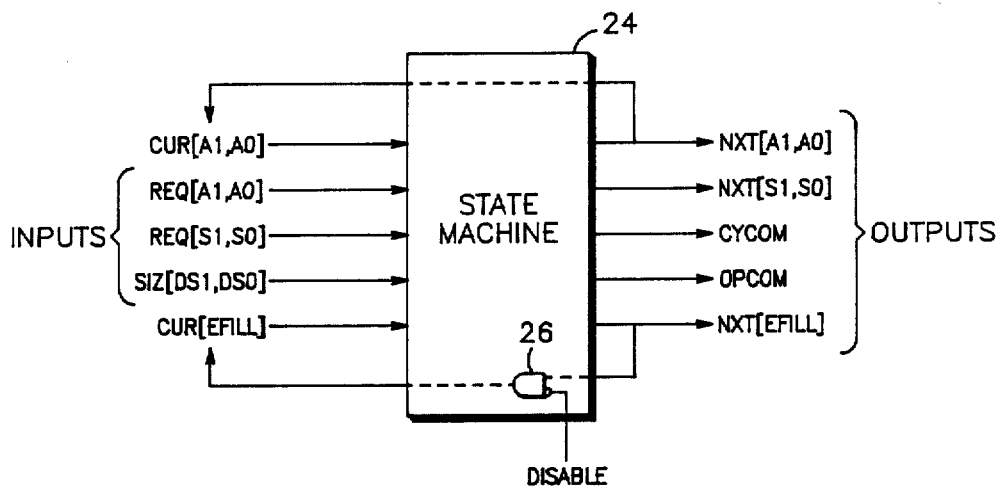
FIG. 3 illustrates in block diagram form, a cache entry fill state machine of the bus master shown in FIG. 1.
Figure 4:
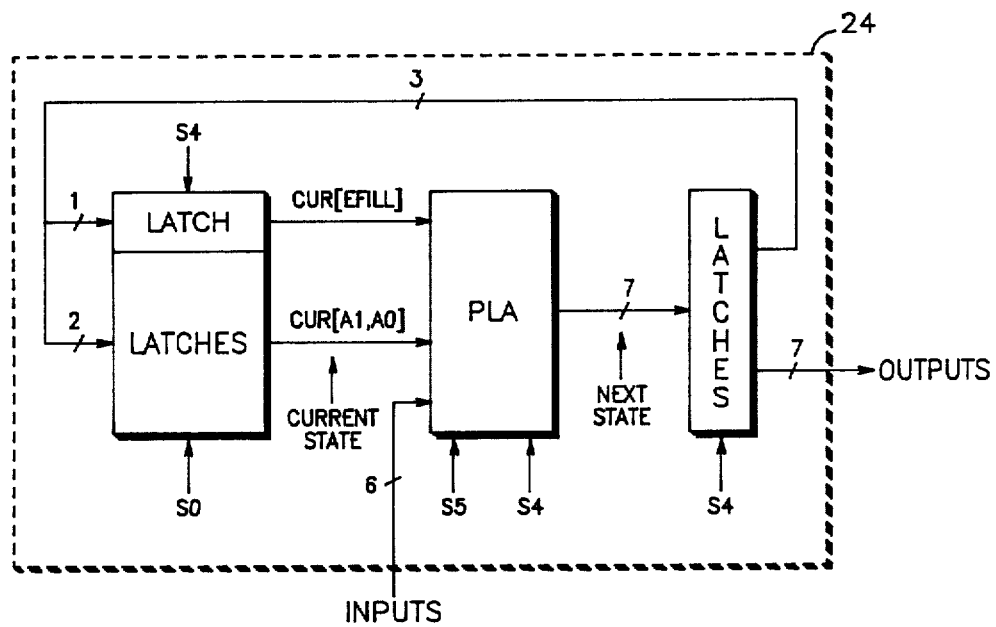
FIG. 4 illustrates in block diagram form, the detailed inputs and outputs of the PLA portion of the state machine shown in FIG. 3.
Figure 5:
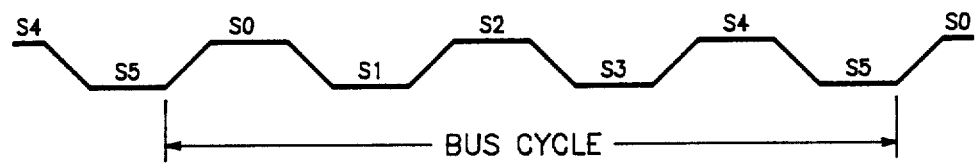
FIG. 5 illustrates the timing signals used in the state machine shown in FIG. 4.

Shown in FIG. 3 is a simplified form of a state machine 24 in the bus master 12 which coordinates the transfer of operands from the system memory 16 and the filling of entries in the state cache memory 22. In the preferred form, the machine 24 receives the following control inputs: the low order two bits of the address of the requested operand (REQ[A1,A0]), the encoded size of the requested operand (REQ[S1,S0]), and the encoded "size" of the data port between the bus master 12 and the system memory 16 (SIZ[DS1,DS0]). In response to these signals (and others discussed below), the state machine 24 provides the following output signals: the low order two bits of the address to be sent to the system memory 16 during the next bus cycle (NXT[A1,A0]), the encoded size of the operand to be requested from the system memory 16 during the next bus cycle (NXT[S1,S0]), a signal that indicates whether the next bus cycle is a special cycle to transfer an operand that was not requested but is required to fill an entry in the cache line (NXT[EFILL]), a signal that indicates that a cache entry FIG. 11 cycle has been completed (CYCOM), and a signal that indicates that the operand cycle has been completed (OPCOM). The state machine 24 also internally recirculates the following as status inputs: the low order two bits of the address being sent to the system memory 16 during the current bus cycle (CUR[A1,A0]), and the EFILL signal being output during the current bus cycle (CUR[EFILL]). A more detailed block diagram of the state machine 24 is shown in FIG. 4, which operates on a six-stage clock shown in FIG. 5. The state table for the PLA shown in FIG. 4 is shown in FIG. 6. The operation of the state machine 24 is typified by the following three (3) sets of examples:

| CASE 1A: BYTE[3] OPERAND TRANSFER ON 8-BIT PORT | | | | | | |
|---|---|---|---|---|---|---|
| CYCLE | SIZE | [A3,A0] | PORT | OPERAND | CACHE | VALID |
| 1 | BYTE | 0011 | BYTE | BYTE[3] | BYTE[3] | |
| 2 | 3-BYTE | 0000 | BYTE | | BYTE[0] | |
| 3 | WORD | 0001 | BYTE | | BYTE[1] | |
| 4 | BYTE | 0010 | BYTE | | BYTE[2] | ENTRY[00] |

In Case 1A, a single 8-bit byte is requested from an address in the system memory 16 having low order address bits [A3,A0]of [0011](i.e., byte [3]in the cache line), and the memory 16 is capable of providing the requested operand via a port that is only 8-bits wide. As can be seen, the operand transfer cycle is completed at the end of the first bus cycle, but the state machine 24 continues to run three (3) successive bus cycles in order to fill the remaining three (3) bytes (i.e., bytes [0,2]) of the corresponding entry [00]in the cache 22. At the end of the fourth bus cycle, the entire entry [00] has been filled and is marked valid.

| CASE 1B: BYTE[3] OPERAND TRANSFER ON 16-BIT PORT | | | | | | |
|---|---|---|---|---|---|---|
| CYCLE | SIZE | [A3,A0] | PORT | OPERAND | CACHE | VALID |
| 1 | BYTE | 0011 | WORD | BYTE[3] | WORD[2,3] | |
| 2 | WORD | 0000 | WORD | | WORD[0,1] | ENTRY[00] |

In Case 1B, the same 8-bit byte [3] is requested, but the memory 16 is now capable of providing the requested operand via a port that is 16-bits wide. As in Case 1A, the operand transfer cycle is completed at the end of the first bus cycle, but two (2) adjacent bytes [2,3] are simultaneously transferred. Thus, the state machine 24 needs to run only one (1) additional bus cycle in order to fill the remaining two (2) bytes [0,1] of the corresponding entry [00] in the cache 22. At the end of the second bus cycle, the entire entry [00] has been filled and marked valid.

| CASE 1C: BYTE[3] OPERAND TRANSFER ON 32-BIT PORT | | | | | | |
|---|---|---|---|---|---|---|
| CYCLE | SIZE | [A3,A0] | PORT | OPERAND | CACHE | VALID |
| 1 | BYTE | 0011 | LONG | BYTE[3] | LONG[0,3] | ENTRY[00] |

In Case 1C, the same 8-bit byte [3] is requested, but the memory 16 is now capable of providing the requested operand via a port that is 32-bits wide. As in Cases 1A and 1B, the operand transfer cycle is completed at the end of the first bus cycle, but four (4) adjacent bytes [0,1,3,] are simultaneously transferred. Thus, the state machine 24 needs to run no additional bus cycles in order to fill the corresponding entry [00] in the cache 22, and the entry [00] is immediately marked valid.

| CASE 2A: MISALIGNED WORD[7,8] OPERAND TRANSFER ON 8-BIT PORT | | | | | | |
|---|---|---|---|---|---|---|
| CYCLE | SIZE | [A3,A0] | PORT | OPERAND | CACHE | VALID |
| 1 | WORD | 0111 | BYTE | BYTE[7] | BYTE[7] | |
| 2 | 3-BYTE | 0100 | BYTE | | BYTE[4] | |
| 3 | WORD | 0101 | BYTE | | BYTE[5] | |
| 4 | BYTE | 0110 | BYTE | | BYTE[6] | ENTRY[01] |
| 5 | BYTE | 1000 | BYTE | BYTE[8] | BYTE[8] | |
| 6 | 3-BYTE | 1001 | BYTE | | BYTE[9] | |
| 7 | WORD | 1010 | BYTE | | BYTE[A] | |

-continued

| CASE 2A: MISALIGNED WORD[7,8] OPERAND TRANSFER ON 8-BIT PORT | | | | | |
|---|---|---|---|---|---|
| CYCLE | SIZE | [A3,A0] | PORT | OPERAND | CACHE | VALID |
| 8 | BYTE | 1011 | BYTE | | BYTE[B] | ENTRY[10] |

In Case 2A, a misaligned 16-bit word is requested from an address in the system memory 16 having low order address bits [A3,A0] of [0111] (i.e. bytes [7,8]), and the memory 16 is capable of providing the requested operand via a port that is only 8-bits wide. As can be seen, the operand transfer cycle is not completed until the end of the fifth bus cycle, because the state machine 24 runs three (3) intervening bus cycles, in order to fill the remaining three (3) bytes [4,5,6] of the corresponding entry [01] in the cache 22. At the end of the fourth bus cycle, the entry [01] has been filled, and is marked valid. By the end of the fifth bus cycle, the operand transfer cycle is complete, but the machine 24 continues to run three (3) more bus cycles to fill the remaining three (3) bytes [9,A,B] of the next entry [10] in the cache 22.

| CASE 2B: MISALIGNED WORD[7,8] OPERAND TRANSFER ON 16-BIT PORT | | | | | |
|---|---|---|---|---|---|
| CYCLE | SIZE | [A3,A0] | PORT | OPERAND | CACHE | VALID |
| 1 | WORD | 0111 | WORD | BYTE[7] | WORD[6,7] | |
| 2 | WORD | 0100 | WORD | | WORD[4,5] | ENTRY[01] |
| 3 | BYTE | 1000 | WORD | BYTE[8] | WORD[8,9] | |
| 4 | WORD | 1010 | WORD | | WORD[A,B] | ENTRY[10] |

In Case 2B, the same 16-bit word [7,8] is requested, but the memory 16 is now capable of providing the requested operand via a port that is 16-bits wide. As a result, the operand transfer cycle is now completed at the end of the third bus cycle, because the state machine 24 must run only one (1) intervening bus cycle in order to fill the remaining two (2) bytes [4,5] of the corresponding entry [01] in the cache 22. At the end of the second bus cycle, the entry [01] has been filled, and is marked valid. By the end of the fourth bus cycle, the next entry [10] in the cache 22 is filled and marked valid.

| CASE 2C: MISALIGNED WORD[7,8] OPERAND TRANSFER ON 32-BIT PORT | | | | | |
|---|---|---|---|---|---|
| CYCLE | SIZE | [A3,A0] | PORT | OPERAND | CACHE | VALID |
| 1 | WORD | 0111 | LONG | BYTE[7] | LONG[4,7] | ENTRY[01] |
| 2 | BYTE | 1000 | LONG | BYTE[8] | LONG[8,B] | ENTRY[10] |

In Case 2C, the same 16-bit word [7,8] is requested, but the memory 16 is now capable of providing the requested operand via a port that is 32-bits wide. Accordingly, the operand transfer cycle is completed at the end of the second bus cycle. Entry [01] is completely filled by the first bus cycle and marked valid, and entry [10] is completely filled by the second bus cycle.

| CASE 3A: MISALIGNED LONG[A,D] OPERAND TRANSFER ON 8-BIT PORT | | | | | |
|---|---|---|---|---|---|
| CYCLE | SIZE | [A3,A0] | PORT | OPERAND | CACHE | VALID |
| 1 | LONG | 1010 | BYTE | BYTE[A] | BYTE[A] | |
| 2 | 3-BYTE | 1011 | BYTE | BYTE[B] | BYTE[B] | |
| 3 | WORD | 1000 | BYTE | | BYTE[8] | |
| 4 | BYTE | 1001 | BYTE | | BYTE[9] | ENTRY[10] |
| 5 | WORD | 1100 | BYTE | BYTE[C] | BYTE[C] | |
| 6 | BYTE | 1101 | BYTE | BYTE[D] | BYTE[D] | |
| 7 | WORD | 1110 | BYTE | | BYTE[E] | |
| 8 | BYTE | 1111 | BYTE | | BYTE[F] | ENTRY[11] |

In Case 3A, a misaligned 32bit longword is requested from an address in the system memory 16 having low order address bits [A3,A)] of [1010] (i.e., bytes [A,D]), and the memory 16 is capable of providing the requested operand vis a port that is only 8-bits wide. As can be seen, the operand transfer cycle is not completed until the end of the sixth bus cycle, because the state machine 24 runs two (2) intervening bus cycles in order to fill the remaining two (2) bytes [8,9] of the corresponding entry [10] in the cache 22. At the end of the fourth bus cycle, the entry ]10] has been filled, and is marked valid. By the end of the sixth bus cycle, the operand transfer cycle is complete, but the state machine 24 runs two (2) more bus cycles to fill the next entry [11] in the cache 22.

| CASE 3B: MISALIGNED LONG[A,D] OPERAND TRANSFER ON 16-BIT PORT | | | | | |
|---|---|---|---|---|---|
| CYCLE | SIZE | [A3,A0] | PORT | OPERAND | CACHE | VALID |
| 1 | LONG | 1010 | WORD | WORD[A,B] | WORD[A,B] | |

-continued

| CASE 3B: MISALIGNED LONG[A,D] OPERAND TRANSFER ON 16-BIT PORT | | | | | | |
|---|---|---|---|---|---|---|
| CYCLE | SIZE | [A3,A0] | PORT | OPERAND | CACHE | VALID |
| 2 | WORD | 1000 | WORD | | WORD[8,9] | ENTRY[10] |
| 3 | WORD | 1100 | WORD | WORD[C,D] | WORD[C,D] | |
| 4 | WORD | 1110 | WORD | | WORD[E,F] | ENTRY[11] |

In Case 3B, the same 32-bit longword [A,D] is requested, but the memory 16 is now capable of providing the requested operand via a port that is 16-bits wide. As a result, the operand transfer cycle is now completed at the end of the third bus cycle, because the state machine 24 must run only one (1) intervening bus cycle in order to fill the remaining two (2) bytes [8,9] of the corresponding entry [10] in the cache 22. At the end of the second bus cycle, the entry [10] has been filled, and is marked valid. By the end of the fourth bus cycle, the next entry [11] in the cache 22 is filled and marked valid.

| CASE 3C: MISALIGNED LONG[A,D] OPERAND TRANSFER ON 32-BIT PORT | | | | | | |
|---|---|---|---|---|---|---|
| CYCLE | SIZE | [A3,A0] | PORT | OPERAND | CACHE | VALID |
| 1 | LONG | 1010 | LONG | WORD[A,B,] | LONG[8,B] | ENTRY[10] |
| 2 | WORD | 1100 | LONG | WORD[C,D] | LONG[C,F] | ENTRY[11] |

In Case 3C, the same 32-bit longword [A,D] is requested, but the memory 16 is now capable of providing the requested operand via a port that is 32-bits wide. Accordingly, the operand transfer cycle is completed at the end of the second bus cycle. Entry[10] is filled by the first bus cycle and marked valid, and entry [11] is filled by the second bus cycle and marked valid.

Figure 7:
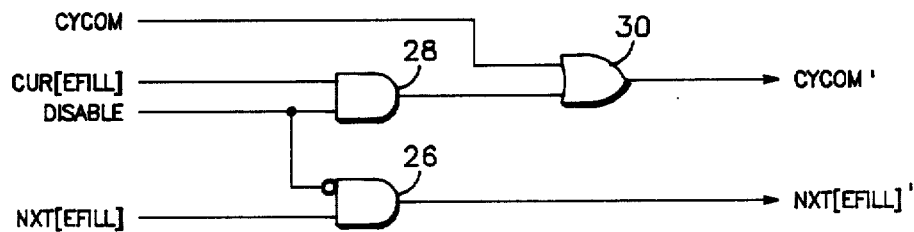
FIG. 7 illustrates suitable logic for selectively disabling the state machine of FIG. 4.

In some circumstances, it may be desirable to inhibit the entry filling activities of the bus master 12, for example, if the cache memory 22 is itself disabled or if the processing activity is too critical to be delayed while the cache entries are filled. In general, the entry filling operation of the state machine 24 can be disabled as shown in FIG. 3 by blocking the recirculation of the EFILL signal via an AND gate 26 in response to a disable (DISABLE) signal. However, if the DISABLE signal is dynamic and might occur during an entry fill cycle, the logic shown in FIG. 7 would be more appropriate, since the latter includes an additional pair of gates 28 and 30 to force the CYCOM signal if the DISABLE signal is received while an entry fill cycle (NXT[EFILL]) is in progress or about to begin.

Although the present invention has been described herein in the context of a preferred embodiment, alternate embodiments may be made without departing from the spirit and scope of the present invention. For example, state machine 24 may be implemented in any of a number of well known forms, and the functionality thereof may be embodied in a micromachine if desired. In systems lacking dynamic bus sizing, the state machine 24 may be significantly simplified. If the size of the entries in a cache line is different, the size detecting criteria of the state machine 24 must be appropriately adjusted.

What is claimed is:

1. In a data processing system having a bus master for controlling transferring a predetermined operand from a system memory into an entry in a line of a cache memory via a data bus, wherein the predetermined operand or a portion thereof provided by the system memory during an initial bus cycle is insufficient in size or alignment to fill said entry, the bus master comprising:

a data translator having a programmable logic device for indicating at least a portion of an address where the predetermined operand is to be written in the cache memory, for receiving a first size signal indicating bit size of the predetermined operand, and for receiving a second size signal indicating data port size between the bus master and system memory, and in response thereto, said programmable logic device providing an output control signal having a predetermined value corresponding to said input data and for use by the system, said output control signal indicating that an immediately subsequent bus cycle is an additional bus cycle line of the cache memory and which controls the subsequent filling of the entry by coupling data from the system memory which is required to fill the entry in the cache line, said data translator also detecting completion of the filling of the entry and providing an entry fill cycle complete signal in response thereto, said entry fill cycle complete signal being used by the system to set valid a predetermined valid entry bit in said cache line.

2. The data processing system of claim 1 wherein the bus master disables the data translator with a disable signal claim 4.

3. The data processing system of claim 1 wherein the data translator further provides an operand cycle complete signal for use by the bus master said operand cycle complete signal indicating termination of communication via the data bus between the system memory, cache memory and the bus master.

4. The data processing system of claim 3 wherein the bus master disables the data translator with a disable signal when said entry fill cycle complete signal is generated by the data translator, thereby terminating entry of the predetermined operand into the cache line.

5. The data processing system of claim 1 wherein the data translator further provides an operand cycle complete signal for use by the system, said operand cycle complete signal indicating termination of communication via the data bus between the system memory, cache memory and the bus master.

6. The data processing system of claim 5 wherein the bus master disables the data translator with a disable signal when said entry fill cycle complete signal is generated by the data translator, thereby terminating entry of the predetermined operand into the cache line.

7. The data processing system of claim 1 wherein the data translator is a programmable logic array.

8. In a data processing system having a bus master with a programmable logic device for controlling transferring a predetermined operand from a system memory into an entry in a line of a cache memory via a data bus, wherein the predetermined operand or a portion thereof provided by the system memory during a first bus cycle is insufficient in size or alingment to fill the entry, a method for storing the predetermined operand in the cache memory, comprising the steps of;

providing data from the bus master indicating at least (a) an address identifier identifying where the predetermined operand is to be transferred to in the cache memory, (b) bit size of the predetermined operand, and (c) data port size between the bus master and system memory;

translating the data from the bus master to indicate whether or not the predetermined operand provided by the system memory is insufficient in size or alignment to fill the entry, and in response to the translating of the data either:

(1) completely filling the entry in the line of the cache memory with the predetermined operand in a single bus cycle, or if the entry is insufficient in size or alignment;

(2) partially filling the entry in the line of the cace memory with the predetermined operand in the first bus cycle and completing filling the entry in one or more subsequent bus cycles by coupling additional data from the system memory to the cache memory until the entry in the line of the cache memory is full; and detecting completion of the filling of the entry and providing an entry fill cycle complete signal in response thereto.

9. The method of claim 8 wherein the predetermined operand is only partially stored in the entry of the line of cache memory and a portion of the predetermined operand is stored in a second line of the cache memory, wherein each entry in line of the memory cache is filled by additional operands from the system memory during bus cycles subsequent to the first bus cycle.

10. The method of claim 8 wherein the one or more additional operands are stored in the system memory adjacent to the predetermined operand.

* * * * *